Jan. 12, 1965 W. P. EWALD ETAL 3,165,250
FILM FLEX PULLDOWN SYSTEM
Filed Jan. 31, 1962 2 Sheets-Sheet 1
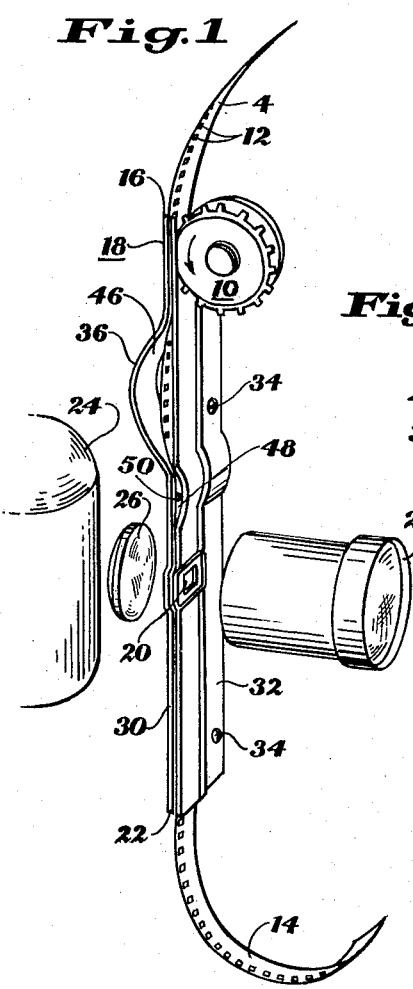
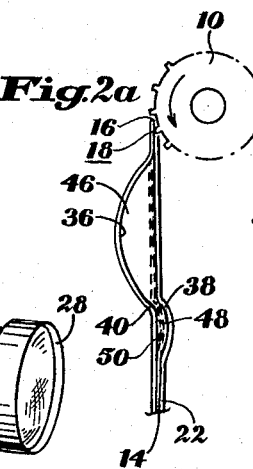
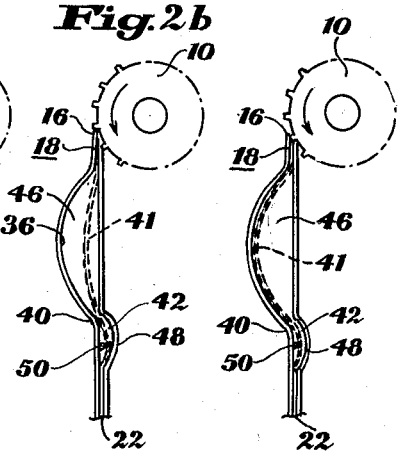
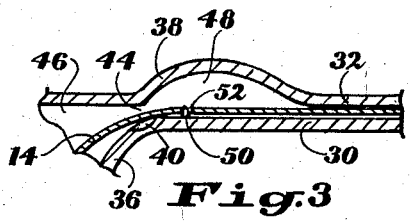
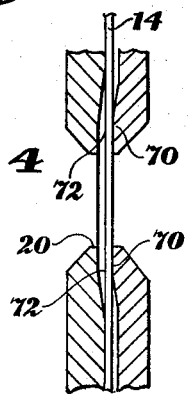
William P. Ewald
Henry E. Brayer
INVENTORS Jan. 12, 1965 W. P. EWALD ETAL 3,165,250
FILM FLEX PULLDOWN SYSTEM
Filed Jan. 31, 1962 2 Sheets-Sheet 2
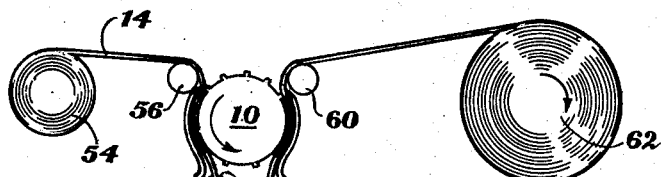
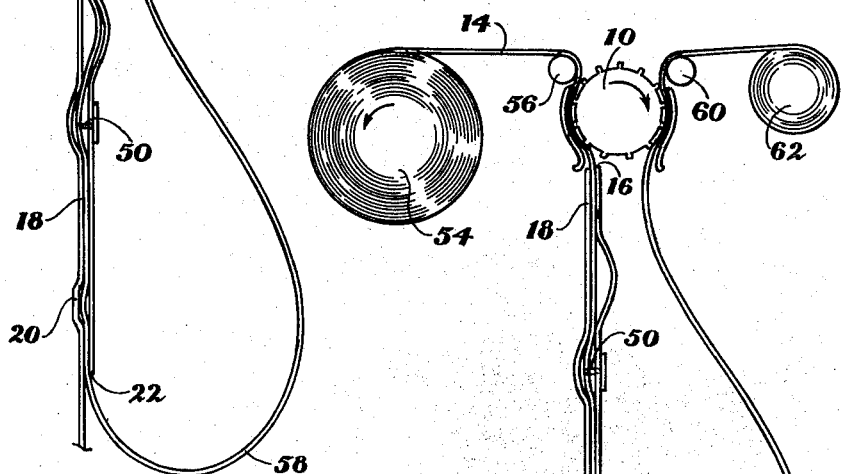
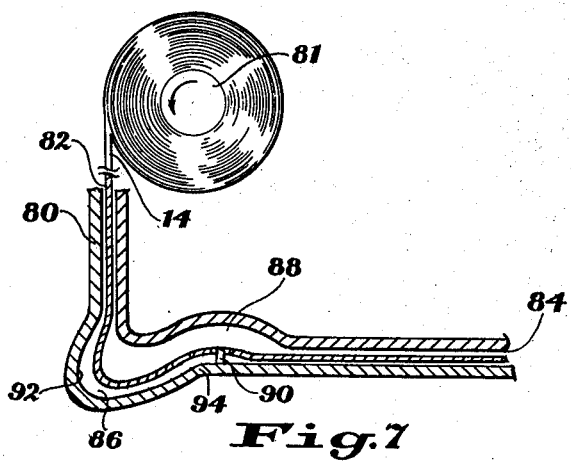
William P. Ewald
Henry E. Brayer
INVENTORS

3,165,250
FILM FLEX PULLDOWN SYSTEM
William P. Ewald, Webster, and Henry E. Brayer, Rochester, N.Y., assignors to Eastman Kodak Company, Rochester, N.Y., a corporation of New Jersey
Filed Jan. 31, 1962, Ser. No. 170,171
7 Claims. (Cl. 226—55)

The present invention relates to apparatus for intermittently advancing a unit length of resiliently flexible material and more particularly to a film-advancing device for motion-picture apparatus to intermittently advance a filmstrip a unit length past an aperture of an optical system.

Generally, the prior art devices that have been utilized for intermittently advancing a perforated filmstrip a unit length past an optical system of a camera or projector have been either: the so-called claw mechanism, which physically pulls the filmstrip a unit distance past the optical system; or, other mechanisms such as a sprocket which is intermittently rotated by suitable mechanism such as the Geneva movement or the like. However, these prior devices have the objection and disadvantage of being comparatively expensive to manufacture, as well as complicated to assemble with the multiplicity of precision manufacturing parts that are required.

Still another objection to the prior art devices for moving the images of filmstrip past an optical system of a projector is the framing of each image of the film. To properly frame each image, either the plate containing the aperture of the optical system, or the claw tooth or sprocket teeth, must be moved relative to the film and the optical center line of the device by means of springs, levers, cams, or the like.

A further objection and disadvantage to the conventional mechanisms heretofore employed is that virtually all of the film-feed devices engage the same edge of each perforation of the filmstrip, pulling the filmstrip into position relative to the optical system of the motion-picture apparatus which thereby sometimes results in one edge of each perforation of the filmstrip becoming excessively worn or damaged.

It is a principal object of this invention to provide an intermittent film-feeding mechanism for motion-picture apparatus which utilizes the resilient flexibility of the filmstrip to advance the filmstrip a unit length.

Another object of this invention is to provide a film-feeding mechanism for motion-picture apparatus in which the filmstrip is accurately positioned relative to the optical system by means of a fixed member.

Still another object of this invention is to provide an intermittent film-feeding device for motion-picture apparatus capable of an exceptionally high-speed feed which does not damage or tear the film.

A still further object of this invention is to provide an intermittent film-feeding mechanism for motion-picture apparatus which has a minimum number of movable elements.

Still a further object of this invention is to provide a film-feeding mechanism for motion-picture apparatus which eliminates the necessity of a shutter for projecting the successive frames of the filmstrip.

A further object of this invention is to provide an intermittent film-feeding mechanism for motion-picture apparatus which is simple in design and inexpensive to manufacture.

Other objects and a fuller understanding of the invention can be had by referring to the following description and claims taken in conjunction with the accompanying drawings in which:

FIG. 1 is a perspective view showing an intermittent film-feeding mechanism constructed in accordance with a preferred embodiment of the present invention combined with the optical system of a projector;

FIGS. 2a–2c are schematic views of the film-feeding mechanism showing the film progressively flexing within the film passageway so as to advance the filmstrip a unit length as it is continuously fed into the film passageway by a sprocket;

FIG. 3 is an enlarged vertical sectional view of that portion of the film-feeding mechanism including the stationary detent, but shown in a horizontal position;

FIG. 4 is an enlarged vertical sectional view of the aperture gate of the film passageway;

FIG. 5 is a side elevation view of one embodiment of the film-feeding mechanism with the filmstrip traveling in a forward direction;

FIG. 6 is a view similar to FIG. 4 with the filmstrip traveling in the reverse direction; and FIG. 7 is a vertical sectional view of another embodiment of the film-feeding mechanism with the filmstrip traveling in a forward direction.

In order to facilitate the understanding of the operation and construction of the apparatus, a brief summary of the device will be helpful. A perforated filmstrip in which each perforation is disposed adjacent one edge and spaced in a determinable position relative to each image area of the filmstrip is guided through a film-guide passageway. A detent is positioned in the path of the filmstrip in a manner such that the detent will co-operate successively with each of the plurality of the perforations of the filmstrip. The two opposed walls forming the film passageway are each recessed in an opposite sense to form substantially concave surfaces having unequal radii. The recesses are offset relative to each other in the direction of film movement such that only a small portion of each overlap to define a common passage therebetween, which passage joins the recesses with one another. The smaller recess, which is positioned close to the exit of the film passageway, is located opposite the detent and is formed to a depth which is greater than the length of the detent projecting from a straight wall opposite the recess. An aperture for the optical system can be located adjacent to the exit of the film passageway.

By means of this structure, the filmstrip can be fed into the film-guide passageway at a substantially constant linear speed whereby the detent momentarily engages a perforation of the filmstrip to stop movement thereof. That portion of the filmstrip being advanced by the sprocket and that portion immediately adjacent to the detent tends to flex substantially into a double reverse curve configuration to define two connected loops. The depth of each loop increases laterally as more film is fed into the passageway whereby the outer surface of each loop tends to move toward the walls of each of the recesses. That portion of the wall adjacent the exit of the first recess creates a fulcrum on which a portion of the filmstrip abuts, and which portion is substantially at the point of inflection of the connected loops formed in the filmstrip. That portion of the filmstrip engaging the detent is momentarily stressed on the detent and then displaced therefrom to quickly form the second loop, which loop has a depth greater than the projecting length of the detent. When the filmstrip is disengaged from the detent, the resilient flexibility of the filmstrip flexes the filmstrip from a double reverse curve configuration to a substantially straight line, and, hence, advances the filmstrip past the optical system. The next performation then engages the detent to repeat the cycle.

Referring more particularly to FIG. 1, the film-advancing mechanism of this invention will be described with particular reference to a motion-picture projector of which only the optical system is shown, and wherein a continuously driven sprocket wheel 10 engages the perforations 12 of a filmstrip 14 to feed the filmstrip from the supply reel, not shown, into a entrance 16 of film-guide passageway 18, past an aperture gate 20, and out an exit 22 of film passageway 18 to a take-up reel, not shown. As each frame of filmstrip 14 is moved into registry with gate 20, an optical system which includes a projector lamp 24, condenser lens 26, and projection lens 28 projects the image onto a screen, not shown.

Film-guide passageway 18 is formed from two substantially flat guidewall members 30 and 32 which are joined together by any suitable fastening means such as screws 34. The inner opposed surfaces of members 30 and 32 along which filmstrip 14 will be conducted with a minimum of frictional engagement are spaced a sufficient distance from each other to readily accommodate the moving filmstrip. The spacing of the members, to define the width and thickness of the passageway, can be accomplished in any known manner such as by spacers, interposed between the edges of the two members, or by built-up portions formed integrally with the opposed members, which portions define a channel between the two members. Further refinements such as rails formed adjacent the edges of the passage to support the moving filmstrip at its edges can be incorporated to reduce the friction and wear on the moving filmstrip.

Intermediate gate 20 and entrance 16 of guide passageway 18, member 30 is bowed rearwardly to form a bowed wall 36 which has a smooth and regular inner surface. Similarly, member 32 is bowed forwardly in the opposite sense from wall 36 to form bowed wall 38 which also has a smooth and regular surface. Wall 38 is formed so that its inner surface has a radius of curvature equal to or less than the inner radius of curvature of bowed wall 36. Each of the bowed walls 36 and 38 formed in the opposite flat members 30 and 32 of film guide passageway 18 are offset from each other a distance such that the exit portion of bowed wall 36 is in alignment with or slightly overlaps the entrance portion of bowed wall 38. Bowed wall 36 co-operates with the oppositely disposed flat portion of member 32 of guideway 18 to define the peripheral boundaries of a chamber 46; and, similar bowed wall 38 co-operates with the oppositely disposed flat portion of member 30 to define the peripheral boundaries of a chamber 48.

As best shown in FIG. 3, the offset relation of bowed walls 36 and 38, defines a common passage 44 which connects chamber 46 with chamber 48. It is to be particularly noted that passage 44 communicating with each of the chambers 46 and 48 has a depth, as determined by the amount of offset of chambers 46 and 48, which is sufficiently great to accommodate a double thickness of filmstrip 14 in a manner such that the flat surfaces of filmstrip 14 will pass freely through passage 44 with each of the surfaces tangentially sliding along the inner walls 36 and 38 of bowed chambers 46 and 48. The smooth and regular surface of the exit of chamber 46 defines a fulcrum 40 therein about which the filmstrip will be pivoted in a manner described hereinbelow. Fulcrum 40 can be a separate element such as a roller or plate mounted in the wall, but preferably it is formed integral with the wall.

As shown in FIG. 1, a detent 50 which can be a pin or an integral projection formed in member 30 is disposed to project inwardly of chamber 48 a sufficient distance to transversely intercept the path of, and to co-operate with, the perforations 12 of filmstrip 14 as it is conducted through passageway 18 between entrance 16 and exit 22. The tip 52 of detent 50, as best shown in FIGS. 3, 5 and 6, has a canted surface with the acme point located most nearly to passage 44. Therefore, when filmstrip 14 is inserted into entrance 16 of film passageway 18, it will be intercepted by detent 50 engaging a perforation thereof and will be prevented from passing from entrance 16 to exit 22 through film passageway 18 under the influence of drive sprocket 10. It will also be apparent that in a reverse direction canted tip 52 of detent 50 will readily allow the perforations 12 of filmstrip 14 to slip over detent 50 without engaging any individual perforation or series of perforations, which engagement could strip the perforations and/or tear the film.

The operation of the device is best shown in FIGS. 2a–2c, wherein a filmstrip 14 is propelled into entrance 16 of film passageway 18 by sprocket wheel 10. As sprocket wheel 10 is driven at a substantially constant speed by a prime mover (not shown), the linear velocity of filmstrip 14 entering passageway 18 will accordingly be substantially constant so that a substantially constant number of frames are fed into the entrance of the passageway in any given period of time. In both threading and continuous operation, passageway 18 guides filmstrip 14 in a path intercepted by detent 50, so that a perforation 12 of filmstrip 14 will engage detent 50 and prevent the continued movement of filmstrip 14 through film passageway 18. However, as sprocket 10 is continuing to feed filmstrip 14 into entrance 16 of passageway 18, filmstrip 14 due to its resilient characteristics, tends to be deformed into a substantially double reverse curved configuration which forms two adjoining loops 41 and 42 in which the point of inflection of the adjoining loops engages the fulcrum 40. As best shown in FIG. 2b and 2c, fulcrum 40 acts as a pivot about which loops 41 and 42 of filmstrip 14 will move as more filmstrip is fed into entrance 16 of film passageway 18 by sprocket 10. However, as a perforation of filmstrip 14 frictionally engages detent 50, the lateral displacement of filmstrip 14 to form loop 42 is restricted until the pivotal stress which is dependent upon the resilient flexibility of the film and its displacement from a straight normal path over a given distance, will snap the film out of engagement with detent 50. The displacement of the loops formed in filmstrip 14 in each of chambers 46 and 48 tends to increase in progressive increments in which the maximum displacement to be obtained is determined by the smooth and regular inner surfaces of both walls 36 and 38 of film passageway 18.

As best shown in FIG. 2c, the displacement of the bowed portion of the filmstrip 14 in chamber 48 has increased by progressive increments a sufficient amount such that the displacement of the bowed portion contained therein exceeds the length of detent 50, and thus the perforation engaging detent 50 will be disengaged from detent 50. Due to the resiliently flexible characteristics of filmstrip 14, the filmstrip, upon being released from detent 50, will rapidly tend to assume its normal and substantially flat configuration, which configuration will be like that as shown in FIG. 2a. The resiliently flexible characteristics of filmstrip 14, advances the next image, as proved in tests, with such speed that a shutter can be dispensed with. Further, bowed wall 36 is not absolutely essentially to the operation of this device, but when it is present, filmstrip 14 will momentarily engage wall 36 whereby a compressive force is exerted on the filmstrip so that the speed with which it is advanced is substantially increased.

The design of bowed walls 36 and 38 is such that the lateral displacement of film in chamber 46 tends to cause a corresponding lateral displacement of the filmstrip in chamber 48 which will cause disengagement of the filmstrip from detent 50. The disengagement is designed to occur when the length of the filmstrip between sprocket 12 and detent 50 is increased by one frame length greater than that of its flat length. Because filmstrip 14 will be prevented by sprocket 10 from moving toward entrance 16 of passageway 18 at the instant it snaps to a flat configuration as shown in FIG. 2a, that portion of the filmstrip 14 bowed within chambers 46 and 48 will be advanced one unit length relative to detent 50 prior to detent 50 engaging the next adjoining perforation after which the cycle is intermittently repeated. As the advancement of filmstrip 14 is one unit length (or distance between adjoining perforations) before the next perforation seats itself upon detent 50, the wear on any one perforation of film strip is reduced to a minimum. Further, as detent 50 is stationary and positively engages each perforation 12 of filmstrip 14, and because each perforation is uniformly spaced from its adjacent perforations, filmstrip 14 is advanced a uniform distance relative to any given point in the film passageway 18 which is intermediate detent 50 and exit 22. Hence a framing mechanism can be dispensed with, as each image of film strip 14 can be uniformly positioned relative to aperture gate 20.

It is especially noted that the mechanism of this invention does not provide for a drive means which pulls filmstrip 14 from passageway 18 or in any way exerts tension on the film strip as it leaves chamber 48. It has been found that any pulling force exerted thereon will bind the edge of perforation 12 to detent 50 such that the frictional force between detent 50 and the edge of the perforation 12 will prevent lateral displacement of filmstrip 14 to form a double reverse curve configuration. Consequently, filmstrip 14 when it leaves exit 22 of passageway 18 should be formed into a free loop.

As best shown in FIG. 4, the normal track of filmstrip 14 is offset at the aperture gate 20 by built-up portions 70 on one side and recess portion 72 on the opposite side. Thus, as filmstrip 14 intermittently advances through gate 20, the filmstrip is positively positioned in the same focal plane for the projection of each image. Furthermore, the width of the offset at gate 20 is sufficiently great to accept any spliced portions of filmstrip 14 which might pass through.

In addition, in the reverse direction, the filmstrip except for those previously mentioned spliced portions will pass through the gate in a substantially normal track so that the filmstrip will not be flexed within the gate to thus allow a fast reversal or rewind of the filmstrip 14 through the gate.

As best shown in FIGS. 5 and 6, filmstrip 14 passes from the supply reel 54 over guide roller 56 into threaded engagement with the drive sprocket wheel 10 and thence is propelled into the entrance 16 of film passageway 18. As is particularly shown in FIG. 5, filmstrip 14, which is continuously fed by sprocket wheel 10, has engaged detent 50 and has been flexed into its double reverse curve configuration. Filmstrip 14 passes from exit 22 of film passageway 18 and thence it is doubled back on itself to form a free loop 58. The free end of the free loop 58 is then threaded through sprocket 10 and driven thereby, after which a suitable guide roller 60 guides filmstrip 14 onto a take-up reel 62. In this manner, no pulling tension is exerted on the filmstrip 14 at the exit of film passageway 18 so that the perforations 12 of the filmstrip 14 will be frictionally engaged to detent 50. It is not essential that the forward edge of detent 50 be tapered so that the perforations 12 of filmstrip 14 will readily slip off of detent 50 as the purpose of detent 50 is to positively engage each of the perforations 12 and prevent movement of filmstrip 14 through film passageway 18 in the area of the aperture gate 20.

The operation of this film-feeding mechanism particularly depends upon filmstrip 14 being halted by the engagement of each perforation 12 with detent 50, after which the flexure of filmstrip 14 due to its being continuously fed into film passageway 18 by sprocket 10 will produce a double reverse curve whereby increasing increments of lateral displacement of filmstrip 14 in chamber 48 will disengage the filmstrip from detent 50.

In FIG. 6, the direction of rotation of sprocket wheel 10 has been reversed so that filmstrip 14 is not being rewound upon supply reel 54. Because the outermost end of detent 50 is canted, the perforations of filmstrip 14 will slip over detent 50. The only flexure occurring in filmstrip 14 on the rewind cycle is that flexure which is necessary for the filmstrip 14 to pass over detent 50 as sprocket wheel 10 exerts a pulling force on filmstrip 14 through the film passageway 18.

In FIG. 7, another embodiment of our invention is shown wherein the filmstrip 14 is fed into a guideway 80 from the supply reel 81 by a sprocket wheel, not shown, in a manner similar to that disclosed hereinbefore. However, it is to be particularly noted that the axis of the entrance 82 is arcuately displaced substantially 90 degrees from the axis of the exit 84. Filmstrip 14 enters chamber 86 and is guided towards chamber 88 into which a detent 90 projects. Once a perforation in filmstrip 14 engages detent 90 that portion of the filmstrip 14 between the sprocket and detent will bow outwardly to form a loop tending to contact wall 92 of chamber 86 which thereby fulcrums filmstrip 14 about fulcrum 94 located in the exit of chamber 86 to momentarily stress and disengage filmstrip 14 from detent 90. Hence, filmstrip 14 is advanced a unit length in a manner disclosed hereinabove.

In a projector operating at normal speeds of approximately 18 frames per second, it has been found that the film-feeding device of this invention has been particularly successful in that each frame comes into registry with gate 20 in approximately half the time that is required by conventional gate and intermittent pulldown mechanisms. Because of the rapidity with which each frame can enter and leave the gate, and because of the increased time in which a single frame can be retained in the aperture, a projector constructed in accordance with this invention need not have the conventional shutter mechanism. Furthermore, it has been found that the upper limit of the film-feeding mechanism of this invention is in excess of 400 frames per second, which speed greatly exceeds the maximum frame per second speed that can be passed through a projector employing the conventional claw-type pulldown mechanisms. Also, another advantage of this invention is that a single sprocket wheel can be used to both propel the filmstrip into the entrance of the film passageway and also to pull the filmstrip out of the exit so long as a free loop is provided intermediate the exit and the sprocket wheel.

It is, of course, apparent that although the mechanism of this invention has been described in connection with a projector, the mechanism would be equally applicable to any device requiring intermittent advancement of perforated filmstrips, i.e., camera, editor, viewer, etc.

While the embodiments of the invention shown and described herein have been particularly described in connection with motion-picture projectors, it is to be understood that the inventive idea can be carried out in other photographic apparatus requiring intermittent feeding of a perforated filmstrip; and, therefore, this application is not to be limited to the precise details described herein, but is intended to cover all variations and modifications falling within the scope of the appended claims.

We claim:

1. A device for converting continuous substantially constant linear speed advancement of a strip of perforated resilient material fed into and through a portion of a path from a supply, into intermittent advancement of a unit length of said material from the exit of said path, said device comprising (a) stationary detent means extending into said path in advance of said exit for engaging successive perforations in said strip to interrupt the movement of said strip through said path;

(b) and guide wall means spaced along and disposed relative to said path at a point adjacent said detent means to impart a first bowed curvature laterally of said path to that portion of said strip continuously advanced into said path and a second bowed curvature laterally of said path in opposed relation to said first bowed curvature to that portion of said strip engaged by said detent means when a perforation of said strip engages said detent means, said guide wall means being so located with respect to each other and said detent means that said bowed portions of said strip are displaced laterally in increasing increments from said path until the perforation engaged by said detent means is disengaged therefrom by reason of said bowing action to allow said strip to resiliently flex and straighten out prior to repeating the cycle.

2. A film feeding device for converting the linear advancement of a perforated filmstrip conducted through a double walled passageway defining a normal path having an entrance and an exit into intermittent advancement of a unit length past a given point in said path including means for advancing said strip at a substantially constant linear speed into said entrance of said path, the combination comprising:

(a) first and second chambers disposed on opposite sides of said path in advance of said given point and spaced from each other longitudinally of said path to form a common passageway for conducting said filmstrip from said first chamber to said second chamber;

(b) fulcrum means formed on one side of said common passageway adjacent the exit of said first chamber;

(c) and stationary detent means extending into said path and projecting from the same side thereof as said first chamber and into said second chamber for engaging successive perforations of said filmstrip as said filmstrip is advanced in said path from said entrance to said exit to interrupt the movement of said filmstrip through said path whereby adjoining first and second bows are formed in said filmstrip in advance of said detent means, which bows define substantially a reverse curve whose bows are displaced laterally in increasing increments from said path and within each of said chambers as said filmstrip is continuously advanced, with the point of inflection of said reversely curved filmstrip engaging said fulcrum means, until the filmstrip of the second bow is stressed and caused to disengage from said detent means to allow said filmstrip to resiliently flex and straighten out to advance said filmstrip a unit length past said given point whereupon the cycle is repeated.

3. A film feeding device for converting the linear advancement of a perforated filmstrip from a supply into intermittent advancement of a unit length past a given point including means for advancing said filmstrip at a substantially constant linear speed, the combination comprising:

(a) a filmstrip passageway including said given point formed to conduct said filmstrip in a normal path from an entrance to an exit;

(b) first and second chambers of unequal size disposed on opposite sides of said passageway in advance of said given point and spaced from each other longitudinally of said path to form a direct passageway for conducting said filmstrip from said first chamber to said second chamber with said first chamber larger than said second chamber;

(c) a fulcrum formed near the intersection of the axis of said direct passageway from said first chamber and the axis of said normal path of said filmstrip in said second chamber;

(d) and a detent projecting substantially transverse to the normal path of said filmstrip adjacent said fulcrum and substantially centrally disposed to said second chamber for engaging each of said perforations of said filmstrip as said filmstrip advances into said second chamber to interrupt the movement of said filmstrip through said normal path whereby adjoining first and second bows are formed in said filmstrip in advance of said detent means, which bows define substantially a reverse curve whose bows are stressed to displace laterally in increasing increments within said chambers as said filmstrip is continuously advanced into said film passageway with the point of inflection of said reversely curved filmstrip engaging said fulcrum means until the perforation of the second bow is caused to disengage from said detent means to allow said reversely curved filmstrip to resiliently flex and straighten to advance said filmstrip a unit length past said given point whereupon the cycle is repeated.

4. A film feeding device for converting the continuous linear advancement of a perforated filmstrip from a supply into intermittent advancement of a unit length past an optical system including means for advancing said filmstrip at a substantially constant linear speed, the combination comprising:

(a) a filmstrip passageway including an entrance and an exit formed to conduct said filmstrip in a substantially straight path from said entrance to said exit;

(b) a first chamber formed by a curved wall of a substantially constant radius of curvature at one side of said passageway in advance of said optical system;

(c) a second smaller chamber formed by a curved wall of a substantially constant radius of curvature smaller than said first chamber and spaced at the opposite side of said path and spaced longitudinally along said path from said first chamber;

(d) a common passageway connecting said first and second chambers for conducting said filmstrip from said curved wall of said first chamber to said curved wall of said second chamber;

(e) a fulcrum formed intermediate said curved wall of said first chamber and one side of said film strip passageway in said second chamber;

(f) and a stationary detent located adjacent said fulcrum projecting substantially transversely of the path of said filmstrip into and centrally disposed relative to said second chamber for successively engaging each of said perforations of said filmstrip as said filmstrip advances into that portion of the path including said second chamber to interrupt the movement of said filmstrip through said filmstrip passageway whereby adjoining first and second bows are formed in said filmstrip in advance of said detent and which bows define substantially a reverse curve said bow portions of which are stressed and displaced laterally in increasing increments within said chambers as said filmstrip is continuously advanced into said film passageway with the point of inflection of said reversely curved filmstrip engaging said fulcrum means until the engaged perforation of the second bow is caused to disengage from said detent to allow said reversely curved filmstrip to resiliently flex and straighten to advance said filmstrip a unit length past said given point whereupon the next perforation engages said detent and the cycle is repeated.

5. A device for converting continuous substantially constant linear speed advancement of a strip of perforated resilient material fed into and through a double walled passageway for confining said strip facewise to a normal path from a supply into intermittent advancement of successive units of length of material past a given point in said path, said device comprising:

(a) stationary detent means extending into said normal path in advance of said given point for engaging successive perforations in said strip to interrupt the advancement of said strip through said path;

(b) and means associated with opposite walls of said passageway in advance of said given point providing increased freedom of movement in a direction laterally of the path for that portion of said strip immediately adjacent said detent means such that said portion assumes a reverse curvature during the time said detent means is in engagement with a perforation of said strip, said reverse curvature comprising first and second bows adjoining each other,
(1) said first bow being located in advance of said second bow and being laterally displaced in increasing increments from said normal path while said strip is being advanced into said path,
(2) said second bow including that portion of said strip engaged by said detent means whereby each of said bows is displaced laterally in increasing increments from said normal path until the perforation engaged by said detent means is disengaged therefrom freeing said bowed strip to resiliently flex and straighten out and thereby advance a unit length, as determined by the engagement of the next successive perforation with said detent means to initiate repetition of such cycle of operation.

6. A device for converting continuous substantially constant linear speed advancement of a strip of perforated resilient material fed into and through a passageway for confining said strip facewise to a normal path from a supply into intermittent advancement of successive units of length of such material restricted to a predetermined path along a given portion of said normal path, said device comprising:
(a) a detent means extending in one direction into said normal path in advance of said given portion for engaging successive perforations in said strip to interrupt the advancement of said strips through said path,
(b) and means associated with said passageway in advance of said given portion providing increased freedom of movement in a direction laterally of the path for that portion of said strip immediately adjacent said detent means such that said portion assumes a reverse curvature during the time said detent means is in engagement with a perforation of said strip, said reverse curvature comprising first and second bows adjoining each other,
(1) said first bow being located in advance of said second bow and being displaced laterally from said normal path in a direction substantially opposite to the direction in which said detent means extends into said path in increasing increments to accommodate a part of that portion of said strip being continually advanced,
(2) said second bow including that portion of said strip engaged by said detent means being displaced laterally of said normal path in substantially the same direction in which said detent means extends into said path and in increasing increments proportional to the increments of lateral displacement of said first bow, said detent means engaging a perforation of said strip to stress said second bow in increasing increments of force as the increments of displacement of said first bow increase until the forces acting on said second bow displace the perforation of said strip from said detent means freeing said strip to resiliently flex and straighten out and thereby advance a unit length past said given portion as determined by engagement of the next successive perforation with said detent means to initiate repetition of such cycle of operation.

7. Mechanism for intermittently feeding a perforated motion picture film past the aperture of a motion picture apparatus comprising,
(a) guide means for directing said film past said aperture and confining that portion of the film approaching and passing said aperture to a normal path in which the film lies substantially in a plane,
(b) means for advancing said film at a substantially constant rate into said guide means,
(c) stationary detent means extending into said normal path in advance of said aperture for engaging successive perforations in said film when the same assumes said normal path to interrupt the advancement of said film past said aperture; and
(d) means associated with said guide means in advance of said aperture providing increased freedom of movement in a direction laterally of the path for that portion of the film immediately adjacent said detent means and being fed into said guide means to accumulate into first and second loops adjoining each other in a reverse curvature relationship while said detent means is in engagement with a perforation, said first loop being located in advance of said second loop and on the same side of said normal path from which said detent means extends into said path, and being laterally displaced in increasing increments from said normal path as the film is continuously fed into said guide means, and said second loop including that portion of the film engaged by said detent means and adapted to be displaced laterally in increasing increments from said normal path until the perforation engaged by said detent means is disengaged therefrom freeing said looped portion of film to resiliently flex to said normal path and thereby advance said film a unit length as determined by engagement of the next successive perforation with said detent means to initiate repetition of such cycle of operation.

References Cited in the file of this patent
UNITED STATES PATENTS

| | | |
|---|---|---|
| 2,631,492 | Calvin | Mar. 17, 1953 |
| 2,675,735 | Gentilini | Apr. 20, 1954 |